June 2, 1964  C. L. GODAR  3,135,071
MACHINE TOOLS
Filed May 31, 1960  6 Sheets-Sheet 1
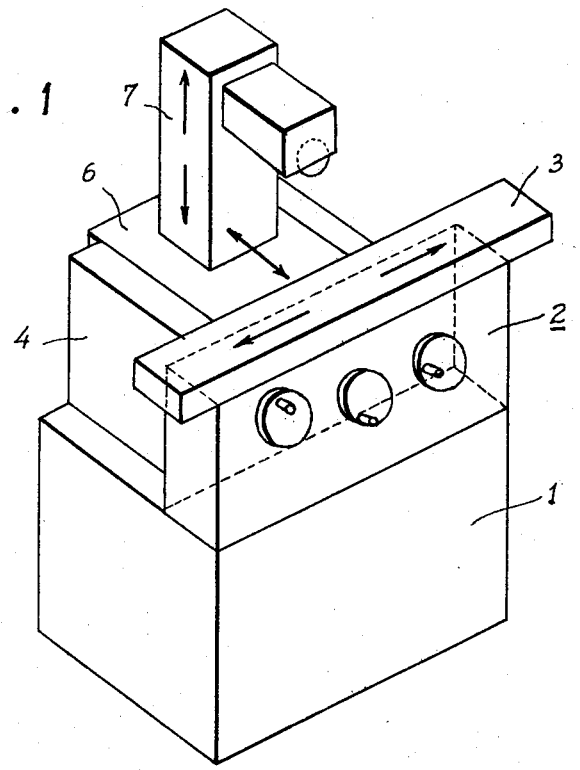
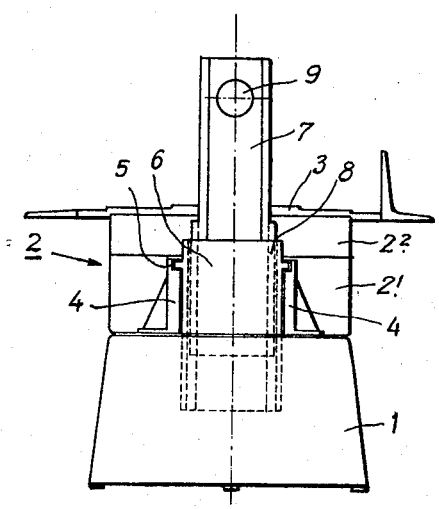
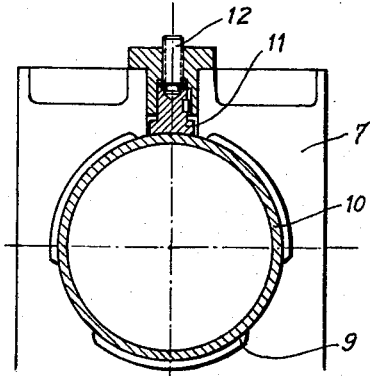
Inventor
Charles Louis Godar
By Stevens Davis Miller & Mosher
Attorneys June 2, 1964

C. L. GODAR 3,135,071

MACHINE TOOLS

Filed May 31, 1960

Inventor
Charles Louis Godar
By Stevens Davis Miller & Mosher
Attorneys

June 2, 1964

C. L. GODAR 3,135,071

MACHINE TOOLS

Filed May 31, 1960

Inventor
Charles Louis Godar
By Stevens Davis Miller & Mosher
Attorneys

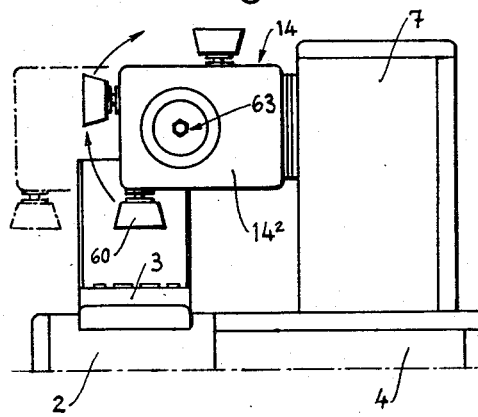
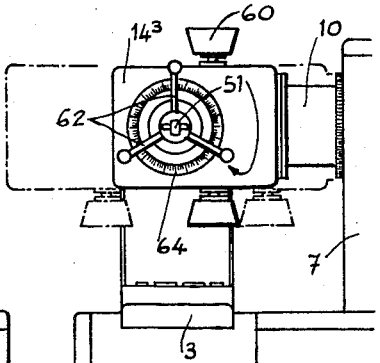
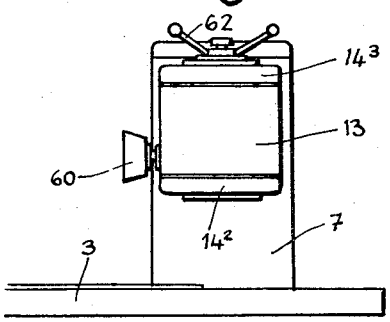
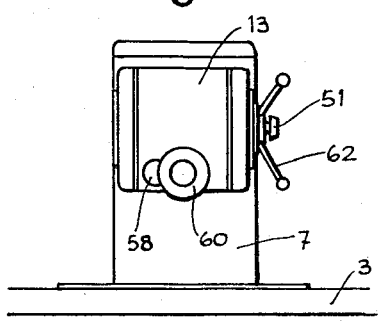

United States Patent Office 3,135,071
Patented June 2, 1964

3,135,071
MACHINE TOOLS
Charles Louis Godar, Paris, France, assignor to Etude et Realisation d'Omnis Precision "E.R.O.P." C. L. Godar, Courbevoie, France, a corporation of France
Filed May 31, 1960, Ser. No. 33,047
Claims priority, application France June 5, 1959
7 Claims. (Cl. 51—166)

The present invention relates to machine tool and more particularly to grinding and like machines.

The machine forming the subject-matter of this invention is characterized essentially in that it is constructed from a number of units or blocks so arranged that, from a basic invariable construction and with only a limited range of interchangeability, it provides very easily a wide variety of machine types from which the user may select the model most adapted to the operation or operations to be performed, thereby providing a solution to an old problem which is advantageous from the dual point of view of the manufacturer and of the user.

According to the construction of this invention, there is provided a machine comprising essentially, on a base, a fixed block on which the motion control members are assembled within easy reach of the operator of the machine, this block supporting the travelling table movable only in its longitudinal direction with respect thereto, another block movable in the transverse direction on said base in relation to the table carrying in addition a vertically displaceable upright on which a movable spindle carrier is mounted, this upright being adapted to receive different machining heads provided with spindles having different or adjustable orientations.

The motion controls may thus be grouped without difficulty in the fixed block, and consist, if desired, only, of manual control members of which some or the whole may be combined with automatic control means, so that a large range of machine models depend only on the equipment of this single block, outside the possibilities offered by the interchangeable machining heads.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which:

FIGURE 1 shows a diagrammatic perspective view of the machine;

FIGURE 2 is a rear view of the machine;

FIGURE 3 is a detail view showing the mounting of a machining head on the spindle-carrying upright;

FIGURE 11 is an elevational view and axial section showing the universal head, the section being taken across the axis of pivotal motion of the spindle-carrying block, the head being mounted on the relevant machine element;

FIGURES 12 and 13 are two elevational views corresponding to FIG. 11, but showing different modes of utilizing the head;

FIGURES 14 and 15 are two front views showing other possibilities of operating the head.

Figure 10:
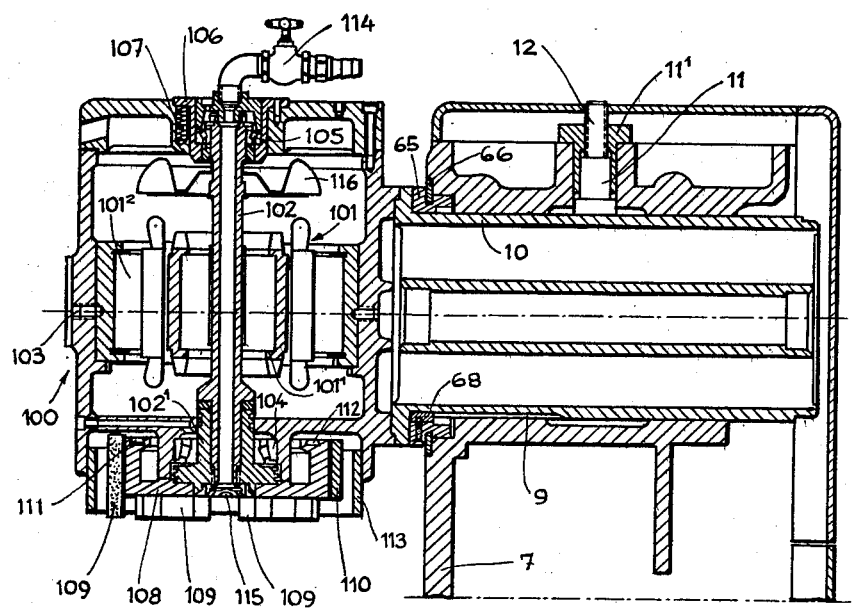
FIG. 10 is an elevational view and axial section showing the head monuted on the corresponding machine element.

Referring notably to FIGS. 1 and 2 of the drawings, it will be seen that the machine according to this invention comprises a base 1 carrying on its front portion a fixed block 2 consisting of a lower supporting bed $2^1$ and an upper bed-carrying bed $2^2$ on which the movable table 3 proper is slidably mounted for longitudinal movement by means of adequate slideways according to conventional practice.

On the base 1 and at right angles to the longitudinal block 2 are rigidly secured two side brackets 4 formed at their upper portion with straight slideways 5 receiving a block 6 adapted to move in the base transversely to the movable table, that is, toward and away from this movable table. Besides, a vertically movable upright 7 is slidably mounted in slideways 8 formed in the block 6 and formed in its upper portion with a transverse bore 9 adapted to receive with a proper fit a detachable, interchangeable machining head provided with a horizontal, vertical or swivelling spindle, according to requirements.

Each machining head designed for use with this machine is provided to this end with a sleeve or shaft 10 fitting in the bore 9 of upright 7 (see FIG. 3) in which it can be clamped by means of a radial pad 11 engaged by a locking screw 12.

Figure 4:
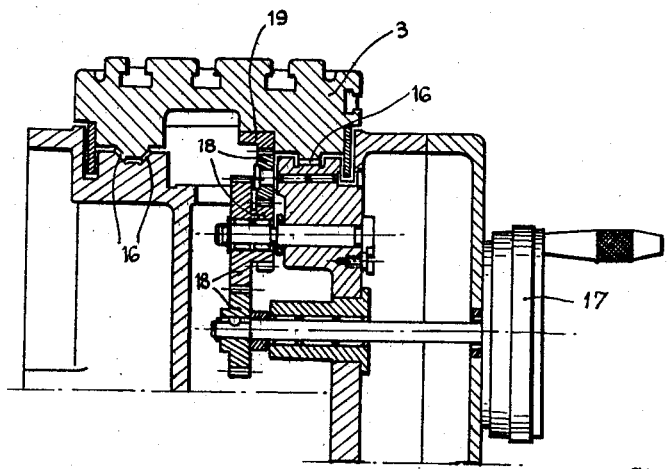
FIGURE 4 is a section taken across the bed and table to show the manual mechanism controlling the longitudinal displacement of the table.

As already stated hereinabove, and as shown in FIG. 4, the table 3 is movable only in its two opposite longitudinal directions in slideways 16 formed in the fixed bed. Its movements may be controlled manually, as usual, by means of a handwheel 17 actuating a double countergearing consisting of spur gears 18 of which the last one meshes with a rack 19 secured under the table 3.

Similarly, this control arrangement may be complemented by hydraulic control means with automatic reversing of any known and suitable type, but comprising notably a double-acting hydraulic cylinder disposed horizontally in the table bed and to which the movable table is operatively connected, the hydraulic distributor members themselves being housed in the bed.

The movements of the machining head 13 transversely to the table 3 is obtained by moving the block 6 with the assistance of a screw-and-nut device controlled by manual and if desired automatic means located within the table bed.

Figure 5:
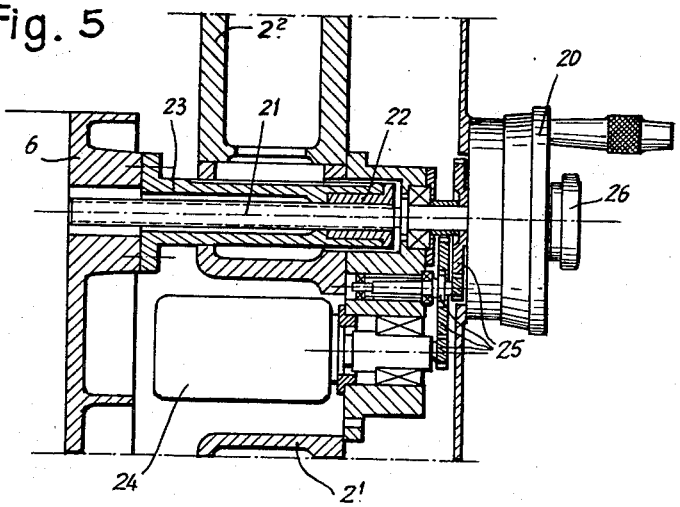
FIGURE 5 is another cross section showing the transverse movement control mechanism.

FIG. 5 illustrates how this movement may be controlled by means of a handwheel 20 keyed on the shaft of a screw-threaded rod 21 engaging a nut 22 mounted on the front end of a tubular support 23 surrounding the shaft 21 and having its rear end secured on the front face of the block 6.

This manual control may be actuated automatically from a motor 24 driving the screw-threaded rod 21 through a suitable gearing as shown at 25. As in conventional practice, the automatic motion may consist either of an intermittent feed movement impressed to the machining head each time the table movement is reversed, or of a continuous feed.

In the case of intermittent feed, the movement is stopped for example by means of cams mounted on the shaft 21 within the fixed drum of handwheel 20 and coacting with switch means adapted to be preselected to provide the desired feed characteristics. In the case of a manual control the automatic transmission may be disengaged with the assistance of a device controlled by means of a knob 26 disposed centrally of the handwheel 20 so that the latter may be moved along its axis in relation to the screw shaft in order to release the proper components of the automatic transmission to be disengaged.

Thus, it will be readily understood by anybody conversant with the art that with the complete control block construction as described so far it is possible, in combination with the hydraulic-controlled longitudinal movement, to perform each machining stroke in a completely automatic manner.

The vertical movement of the machining head is also controlled by a mechanism housed in the table-supporting bed which co-acts with a device located within the block 6; this device remains unchanged whether the vertical movement is only manual or automatic (for example in case of fast approach or disengagement).

Figure 6:
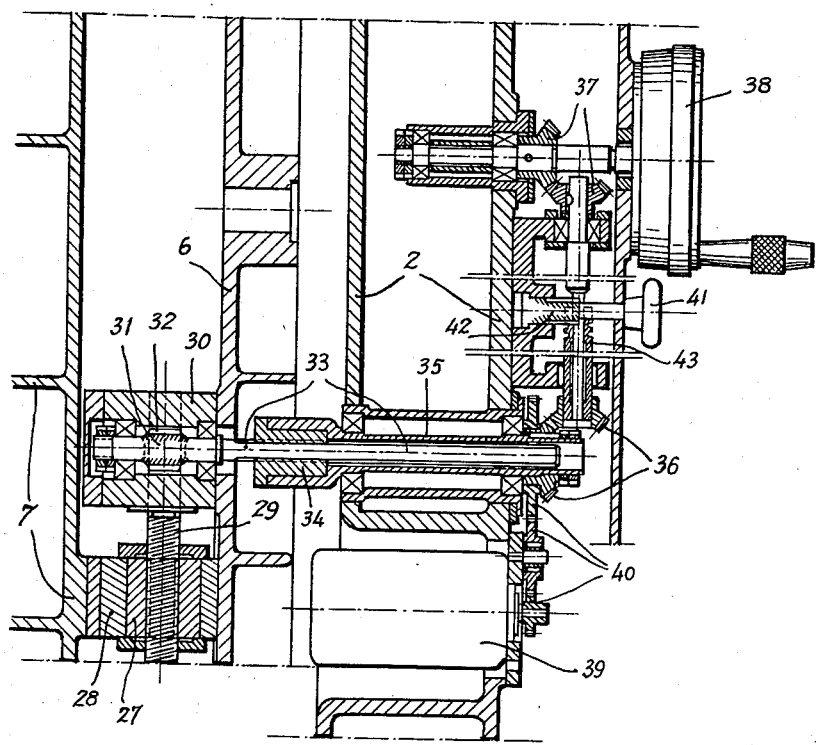
FIGURE 6 is another cross section illustrating the vertical movement control mechanism.

As will be seen in FIG. 6, the control device housed within the transverse block 6 is of the screw-and-nut type wherein the nut 27 is mounted in a case 28 secured on the spindle-carrying upright 7, the screw 29 being mounted in a case 30 secured on the block 6. The last-mentioned case 30 has also mounted therein on the one hand a pinion 31 keyed on the screw shaft 29 and on the other hand a worm 32 carried by a shaft 33 extending horizontally to the front of block 6 and formed with a splined portion adapted to be rotatably driven by means of a rotary socket 34 formed with corresponding inner splines and rigid with the table bed.

This sliding mounting of the shaft 33 and socket 34 permits the transverse movements of the block 6. The rotary socket 34 is rigid with a hollow shaft 35 driven through the medium of a pair of bevel gearings 36, 37 from a control handwheel 38.

When it is desired to drive the upright automatically, this vertical movement is obtained with the assistance of an auxiliary motor 39 driving the shaft 35 through gears 40. A clutch arrangement for disconnecting the manual control may be provided between the two bevel gears 36 and 37, for example in the form of a rotary knob device 41 adapted in this case to disconnect the gears 36 or 37 by lifting one of them (the shaft 42 meshing with a sleeve 43 carrying one of these gears).

A few forms of embodiment of machining heads suitable for equipping the machine of this invention, according to needs, will now be described by way of example.

Figure 7:
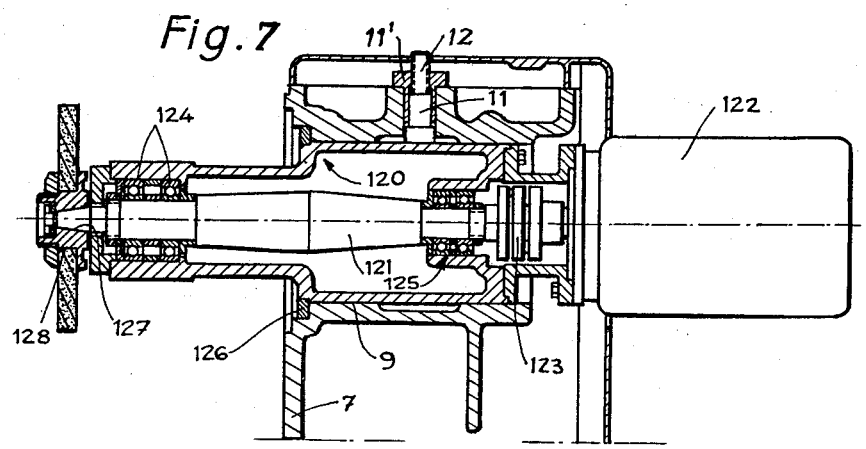
FIGURE 7 is an elevational view and axial section showing a horizontal head with built-in motor.
Figure 8:
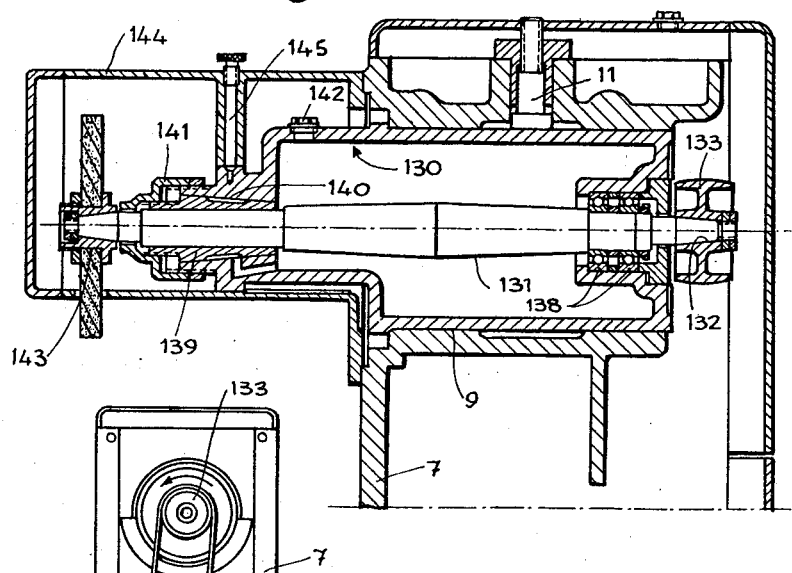
FIGURE 8 is a view similar to FIG. 7 showing a vertical head with separate motor.
Figure 9:
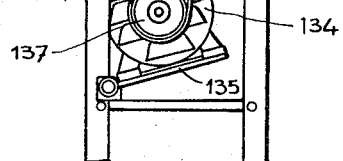
FIGURE 9 is a rear view showing the mounting of the head of FIG. 8 on the machine.

Two horizontal heads are illustrated in FIGS. 7 to 9 of the drawings. The machining head illustrated in FIG. 7 comprises a spindle-carrying block 120 consisting of a substantially tubular body adapted to fit directly for sliding movement in the horizontal bore 9 of upright 7. The spindle carrier 120 is adapted to be locked or clamped in the selected axial position by means of a radial clamping pad 11 engaged by a screw 12 screwed in a plug 11¹ secured on the upright and adapted to guide the pad 11, as shown.

The spindle proper 121 extends coaxially in the tubular holder 120 and is adapted to be driven therein at its rear end by means of a motor 122 mounted in axial alignment thereto, on the block, by means of flanges, the motor shaft being connected to the spindle shaft by means of an elastic coupling 123.

In the tubular holder 120, the spindle 121 of relatively large cross-sectional area is axially supported at the front by a pair of ball-bearings 124 with oblique races and is simply centered at the rear by another pair of ball-bearings 125. These two pairs of end ball-bearings may be for example of the self-lubricating type.

The assembly comprising the spindle-carrier 120 and the motor 122 is mounted in the upright 7 from the rear end of the bore 9 formed in this upright, this assembly being firstly caused to engage a stop ring 126 fitted at the front of the housing 9, and then locked in position by means of the clamping device comprising the pad 11.

The spindle is provided at its front end with a tapered portion 127 on which a tool-carrier (in this case a grinding-wheel carrier 128) is adapted to be mounted according to the conventional method.

According to another form of embodiment illustrated in FIGS. 8 and 9, the spindle-carrier 130 is also fitted directly in the bore 9 of upright 7 and the spindle 131 extends axially through this block and is formed at its rear end with a tapered portion 132 receiving a pulley 133 adapted to be driven from a separate motor.

In this example, the motor 134 is mounted on the upright 7 by means of a hinged support 135 for properly tensioning the transmission belt 136 connecting the driving pulley 137 to the driven pulley 133.

The spindle 131 is axially guided and positioned at the rear by means of a pair of ball-bearings 138 having oblique races, and at the front by an adjustable antifriction bearing 139 engaging a tapered cavity 140 formed in the spindle carrier 130. The central bore of this bearing 139 may thus be clamped at will with the assistance of a nut 141 having differential tappings coacting with the spindle-carrier 130 and bearing 139, respectively.

This spindle mounting is particularly suitable for splash lubrication, the housing 130 constituting a convenient oil sump provided with a filler plug 142 and a level plug (not shown).

The front or operative end of the spindle is also provided with a tapered portion adapted to receive the hub 143 of a grinding wheel. This machining head is adapted to be inserted into the bore 9 of upright 7 from the front end thereof and to be locked in position therein by the clamping pad 11. The projecting portion of the head is adapted, if desired, to be enclosed in a protection casing or housing such as 144 centered on the block and positioned in relation thereto by means of a set screw 145. This casing 144 is provided with a detachable front cover permitting a quick replacement of the tool carrier.

FIG. 10 illustrates the so-called vertical head consisting of a spindle-carrying block 100 adapted to be assembled with a socket-forming tubular portion 10 slidably fitted in the bore 9 of upright 7. The tubular portion 10 is adapted to be clamped in position as in the preceding examples. The block 100 comprises a built-in electromotor 101 of which the rotor 101¹ is keyed directly on the spindle 102, the armature assembly 101² being centered in the block 100 and positioned by means of two set screws 103.

The spindle 102 and one spindle end 102¹ are guided by taper roller thrust bearings 104–105 mounted in opposition, the front bearing 104 acting as a reaction or torque bearing.

An automatic play take-up device is mounted in the block 100 at the level of the rear bearing 105 in order constantly to apply the operative stress thereto in the stress direction.

To this end, the outer race of bearing 105 is fitted in the bottom of a cup 106 slidably mounted in the cover of block 100 and urged toward the rear end of the spindle by prestressed axial springs 107. At the front, the spindle end 102¹ is adapted to receive a tool holder consisting in this example of a hub on which grinding segments 108 are secured, this hub fitting on the spindle end by means of screws so as to cover this end. This hub carries in this example six grinding segments 109 adapted to be wedged at their outer peripheral portions between three fixed wedges and three movable wedges 110 secured by screws on the hub 108. The hub and segment assembly may be balanced by means of small weights 111 adapted to be positioned as necessary in a circular groove 112 of dovetail cross-section. A protection case 113 adjustable in the block 100 is provided and only the operative portions of the grinding segments project therefrom.

The thus equipped machining head may be operated with the assistance of a profuse lubrication, the lubricant being fed through an axial passage bored through the spindle 102. At the rear end of the spindle a cock 114 for regulating the lubricant output is connected to a cover of the aforesaid cup 106, this cover being formed with a nozzle engaging the central passage of the spindle. At its front end, this spindle is provided with a diffuser 115 directing the lubricant in the form of radial jets toward the segments. A secondary effect of this liquid distribution is to cool the spindle. Another cooling action is applied to the spindle and motor assembly by a fan 116 having its blades carried directly by the spindle proper, orifices for the induction of fresh air being formed in the cover of the spindle-carrying block.

Finally, the angular position of the head may be identified in relation to the upright 7 by means of a graduated annulus 65 mounted at the front end of the recess or bore 9 by means of a split ring 66. This annulus 65 is connected through sliding key means 68 to the tubular body 10, the head being adapted to be mounted with a certain degree of axial adjustment when fitting the tubular body 10.

On the other hand, a so-called universal head is illustrated in FIGS. 11 to 15 of the drawings. Referring more particularly to FIG. 11, it will be seen that this head comprises a yoke-like portion 14 formed with a shank portion constituting the tubular body 10 to be slidably fitted in the bore 9. This tubular body is adapted to be clamped in the bore 9 by adequate means, for example as in the preceding examples, with the assistance of a radial pad 11.

Figure 16:
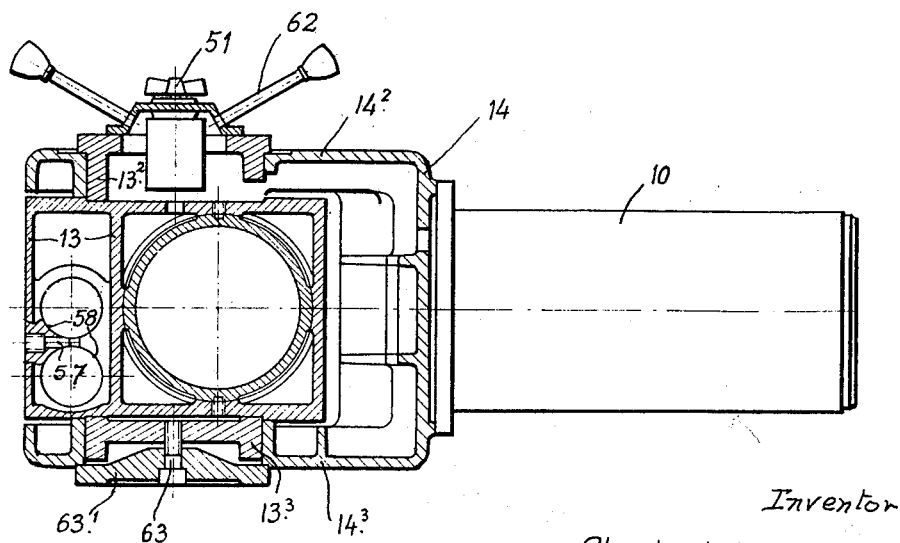
FIGURE 16 is an horizontal section of the head of FIG. 11, taken along the axis of pivotal motion of the spindle-carrying block.

This yoke-like portion 14 comprises two side members $14^2$, $14^3$ having pivotally mounted therebetween about an axis perpendicular to the axis of the tubular body a spindle-carrier 13 constituting a casing enclosing, in addition to the spindle 15, a spindle-driving electromotor 50. The block 13 is pivotally mounted by means of two trunnions $13^2$—$13^3$ as shown in FIG. 16. This motor may be fed through an electric circuit passing through the trunnion $13^2$ of block 13 and comprising a switch 51 mounted endwise thereof.

The motor shaft 52, on which the rotor $50^1$ of the electromotor is directly keyed or otherwise secured, has its ends mounted in ball-bearings 53, one end of this shaft carrying a driving pulley 54. A belt 55 constitutes the transmission from this pulley to another pulley 56 carried by the inner end of the spindle 15 parallel to the motor shaft 52.

This other pulley 56 is keyed or wedged on the spindle shaft 15 also mounted in ball-bearings according to the known method in a spindle casing $15^1$ secured by means of screws 57 in a corresponding recess formed in the block 13. As will be seen from FIGS. 15, 16 two spindle-receiving recesses 58 are provided at two adjacent ends of a mesial line and of a diagonal in that face of the block 13 from which the spindle 15 projects.

Due to this two-recess arrangement, the operator may select the spindle mounting that is most suitable for the conditions of operation contemplated.

The aforesaid belt transmission comprises tension adjusting means in the form of a conventional belt-tightener (not shown) displaceable in a T-slot 59 formed in the block 13. In this example the spindle is shown as carrying a grinding wheel 60.

The electromotor 50 is cooled by a fan having its blades 61 wedged on the motor shaft 52, adequate orifices being provided in the faces of the block 13 to permit the proper air circulation.

The spindle-carrying block 13 may be set in the desired angular position in the yoke-like member 14 by operating one of the three lateral handles 62 connected by a support to one of the trunnions by which the block 13 is pivotally mounted in the yoke, these handles surrounding the switch 51.

Moreover, the spindle-carrier 13 may be locked in the desired position by a screw clamping device 63 comprising a clamping plate $63^1$ provided on the yoke-like member on the side thereof opposite to that carrying the handles 62.

On the handle side the yoke-like member is further provided with a graduated annulus 64 to enable the operator to read the angular position of the spindle-carrier 13 in relation to the yoke-like member.

Similarly, the yoke 14 proper is adjustable by either sliding axially in relation to the tubular body 10 or by causing this tubular body to rotate in its bore 9.

The angular position of the tubular body 10 in relation to the upright 7 is readable on another graduated annulus 65 arranged as already stated in connection with FIG. 10.

It will be clearly seen that the tubular body 10 is formed with an axial groove 67 receiving a sliding key 68 locked in position in the annulus 65 by means of a radial set screw 69.

Figure 15:
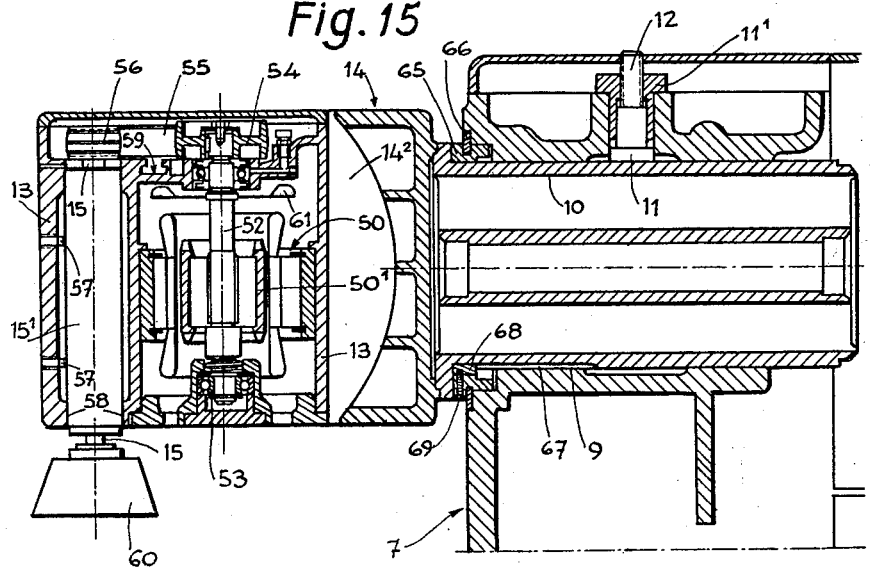

The high degree of maneuverability of this universal head will readily appear from the drawings to anybody conversant with the art. Thus, commencing from FIG. 12, it will be seen that, from an initial position in which the spindle extends vertically, many possibilities are afforded by rotating the spindle-carrier 13 in the yoke-like member (this rotation being shown in this case by the two positions spaced by one-fourth of a revolution as indicated by the arrows). FIG. 13 shows notably a possibility afforded from the position of FIG. 12 by rotating the yoke 14 and its tubular body 10 through a half-revolution, the tubular body 10 being further shown in its maximum outward operative position. FIG. 15 shows another position in which the assembly may be set from the position illustrated in FIG. 13 by rotating through 90° the spindle-carrier 13 to bring the spindle forward. FIG. 14 finally shows an arrangement obtainable by placing the yoke 14 with its side members in horizontal planes, the spindle being located in its casing situated on the diagonal of block 13.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A machine tool comprising a base, a fixed block mounted on the base, a table longitudinally movable on the block, control means for actuating the table carried by the block, a movable block mounted for sliding movement on the base in a direction transverse with respect to the table, control means for the movable block carried by the fixed block, a spindle-carrying upright mounted in vertically sliding fashion in the movable block and control means for the upright including one part carried by the fixed block and a complementary part carried by the movable block, said complementary part including a vertical drive screw extending within said movable block and being in engagement with nut means fastened to the lower part of the upright, and a sliding connection between said two parts in the direction of the relative displacement of the movable block with respect to the fixed block.

2. A machine tool as claimed in claim 1, wherein said upright has a horizontal bore, a sleeve for receiving a spindle-carrying head slidably mounted in the bore and radial fastening means for locking the sleeve in the bore.

3. A machine tool according to claim 1, including a horizontal spindle machining head consisting of a spindle, a spindle-carrying tubular block slidably fitted in a bore formed in the upright of the machine, means locking said tubular block in said bore, said spindle extending forwardly and rearwardly in the axial direction on either side of said tubular block, a tool holder on the front end of said spindle and driving means attached to the rear end thereof.

4. A machine tool according to claim 1, including a vertical machining head comprising a spindle-carrying block provided with a lateral tubular shank slidably fitted in a horizontal bore in the upright of the machine, means locking the shank in position and said spindle-carrying block comprising a built-in motor having a rotor directly secured on the spindle.

5. A machine tool according to claim 1, including a universal machining head comprising a yoke formed with a tubular shank fitted in an axially and angularly adjustable position in a horizontal bore formed in the upright of the machine, said yoke further comprising two side members, a spindle-carrying block pivotally mounted between said side members about an axis extending at right angles to the axis of the shank, an electromotor mounted in said block, with the latter being adapted to be set in any desired angular position and locked in the desired position of adjustment between the side members of said yoke.

6. A machine tool according to claim 5, wherein said spindle-carrying block has at least one spindle-receiving recess having a longitudinal axis parallel to the motor shaft and a rotary spindle casing detachably fitted in said recess and constituting a detachable unit.

7. A machine tool comprising a base, a fixed block mounted on said base, a table mounted on said block and longitudinally movable with respect thereto, control means disposed in said block and operatively connected to said table to move same, a movable block mounted for sliding movement on the base in a direction transverse with respect to said table, said movable block and said table having their top surfaces disposed substantially in the same plane, second control means disposed in said block and operatively connected to said movable block to move same, a spindle-carrying upright member mounted in said movable block and vertically movable with respect thereto, a nut member mounted on the lower portion of said upright member, a drive screw rotatably mounted in said movable block and engaging said nut member, and telescopic operating means disposed between said block and movable block to allow said movable block to move with respect to said block, said telescopic operating means having one end operatively connected to said drive screw while the other end is operatively connected to third control means disposed in said block to vertically move said upright member.

References Cited in the file of this patent

UNITED STATES PATENTS

| | | |
|---|---|---|
| 1,968,362 | West | July 31, 1934 |
| 2,239,103 | Jung | Apr. 22, 1941 |
| 2,370,813 | Portman | Mar. 6, 1945 |
| 2,435,622 | Fielding | Feb. 10, 1948 |
| 2,486,108 | Brunel | Oct. 25, 1949 |
| 2,511,675 | Monpain | June 13, 1950 |
| 2,556,368 | Hegeman | June 12, 1951 |
| 2,650,521 | Steinbrecker | Sept. 1, 1953 |
| 2,923,102 | Couture et al. | Feb. 2, 1960 |

FOREIGN PATENTS

| | | |
|---|---|---|
| 528,218 | Great Britain | Oct. 24, 1940 |
| 886,254 | Germany | Aug. 12, 1953 |